(12) United States Patent
Fu et al.

(10) Patent No.: US 9,906,295 B2
(45) Date of Patent: Feb. 27, 2018

(54) METHOD, DEVICE AND SYSTEM FOR DETECTING OPTICAL SIGNAL

(71) Applicant: ZTE Corporation, Shenzhen (CN)

(72) Inventors: Xihua Fu, Shenzhen (CN); Xinling Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 150 days.

(21) Appl. No.: 14/768,642

(22) PCT Filed: Feb. 13, 2014

(86) PCT No.: PCT/CN2014/072048
§ 371 (c)(1),
(2) Date: Aug. 18, 2015

(87) PCT Pub. No.: WO2014/124597
PCT Pub. Date: Aug. 21, 2014

(65) Prior Publication Data
US 2016/0006504 A1 Jan. 7, 2016

(30) Foreign Application Priority Data
Feb. 18, 2013 (CN) .......................... 2013 1 0052267

(51) Int. Cl.
*H04B 10/079* (2013.01)
*H04B 10/077* (2013.01)
*H04J 3/16* (2006.01)

(52) U.S. Cl.
CPC ....... *H04B 10/0795* (2013.01); *H04B 10/077* (2013.01); *H04B 2210/072* (2013.01); *H04J 3/1652* (2013.01); *H04J 2203/0058* (2013.01)

(58) Field of Classification Search
CPC .............. H04B 10/077; H04B 10/0795; H04B 2210/072; H04J 2203/0058; H04J 3/1652
See application file for complete search history.

(56) References Cited

U.S. PATENT DOCUMENTS

| 8,135,284 B2 * | 3/2012 | Harada ..................... H04J 3/14 370/252 |
| 2006/0000891 A1 | 1/2006 | Bonalle |

(Continued)

FOREIGN PATENT DOCUMENTS

| CN | 1555163 A | 12/2004 |
| CN | 1838568 A | 9/2006 |

(Continued)

OTHER PUBLICATIONS

International Search Report for corresponding application PCT/CN2014/072048 filed Feb. 23, 2014; dated Aug. 14, 2015.

(Continued)

*Primary Examiner* — Shi K Li
*Assistant Examiner* — Mina Shalaby
(74) *Attorney, Agent, or Firm* — Cantor Colburn LLP

(57) ABSTRACT

A method, device and system for detecting optical signal are provided. The method includes that: an optical signal receiving node receives, from an optical signal sending node, an optical channel signal and the in-band overhead information of the optical channel signal; the optical signal receiving node carries out a misconnection detection on the optical channel signal according to the in-band overhead information and generates corresponding alarm information after determining that there is a misconnection, wherein an OCh TTI and Optical channel signal normal central frequency are carried in the in-band overhead information. The disclosure addresses the problem of how to effectively detect the misconnection of optical fibers after coherent reception technologies, including flexible grid, inverse multiplexing and optical devices, are introduced into related technologies and improves the optical signal receiving accuracy and the error detection and correction capability of a system.

13 Claims, 11 Drawing Sheets

(56) References Cited

U.S. PATENT DOCUMENTS

| | | | |
|---|---|---|---|
| 2007/0013379 | A1 | 1/2007 | Staples et al. |
| 2007/0292129 | A1* | 12/2007 | Yan .................... H04B 10/032 |
| | | | 398/5 |
| 2008/0069559 | A1 | 3/2008 | Harada et al. |
| 2013/0108273 | A1* | 5/2013 | Valiveti ................ H04J 3/1652 |
| | | | 398/79 |

FOREIGN PATENT DOCUMENTS

| | | |
|---|---|---|
| CN | 101145881 A | 3/2008 |
| CN | 101247178 A | 8/2008 |
| CN | 101325465 A | 12/2008 |
| CN | 101835066 A | 9/2010 |
| CN | 102013922 A | 4/2011 |
| CN | 102647301 A | 8/2012 |
| EP | 1081982 A2 * | 3/2001 |
| EP | 1081982 A3 | 1/2004 |
| JP | 2010098546 A | 4/2010 |
| JP | 4906830 B2 | 3/2012 |

OTHER PUBLICATIONS

International Search Report for corresponding application EP14751164 dated Jan. 26, 2016; pp. 9.
SIPO Search Report for corresponding application 2013100522670 dated Feb. 18, 2013; pp. 1.

* cited by examiner

METHOD, DEVICE AND SYSTEM FOR DETECTING OPTICAL SIGNAL

TECHNICAL FIELD

The embodiments of the disclosure relate to the communication field and more particularly to a method, device and system for detecting optical signal.

BACKGROUND

The development of optical transmission technology reveals a trend towards a higher rate on a single channel (e.g. a rate of 400G/1T on a single channel), a higher spectrum efficiency and a high-order modulation format, thus, the most definite and important development direction of optical transmission technology still lies in increasing transmission rate. High-speed transmission confronts a lot of limitations mainly in two aspects: aspect 1: optical transmission technology is developing towards convergence transmission of high spectrum efficiency and high-speed service interface transmission, if spectrum efficiency cannot be improved further, then the convergence of low speed services to a high-speed channel for transmission is not much meaningful, nonetheless, there may be a high-speed Ethernet interface at a client side, thus, the transmission of a high-speed interface still needs to be taken into consideration, and 400G will be the critical point of the limit of spectrum efficiency; aspect 2: as optical transmission technology is developing towards long-distance (long-span and multi-span) transmission, the use of a low-loss fiber and a low-noise amplifier, the shortening of spans and the application of other approaches, although capable of partly improving the Optical Signal-Noise Ratio (OSNR) of a system, cannot make a breakthrough, in addition, it is difficult to implement these approaches in engineering.

With the bandwidth of a bearer network required to be higher and higher, a beyond-100G technology becomes a solution to meet the requirement for higher bandwidth; the Wavelength Division Multiplexing (WDM) of the conventional 50 GHz fixed grid cannot provide a sufficient spectrum width to realize a beyond-100G technology, no matter a 400G technology or a 1T technology. In view of the defects of the fixed grid, a wider flexible grid is needed. In related art, the flexibility of beyond-100G multi-rate hybrid transmission and beyond-100G modulation format gives rise to different requirements on channel bandwidth, if a proper bandwidth is customized for each channel, then the bandwidth of a system can be fully used, thereby generating a flexible grid system. The requirement for an ultra high-speed WDM system brought by the demand for higher and higher bandwidth leads to a demand for a flexible grid technology; the introduction of the flexible grid technology creates spectrum fragmentations, it may occur that no continuous sufficiently wide spectrum can be provided to transmit a beyond-100G service, for example, a 1T Ethernet service, on an optical layer, thus, it is needed to inversely multiplex a 1T electrical container to a plurality of discontinuous spectrums for transmission, thereby improving spectrum efficiency and making the best use of fragmentations of spectrum. Optical devices using coherent reception technologies are developed which are capable of dynamically and correctly receiving optical signals according to configured information such as the received central frequency, spectrum width and modulation format.

No effective solution has been proposed to address the problem of how to effectively detect the misconnection of optical fibers after coherent reception technologies, including flexible grid, inverse multiplexing and optical devices, are introduced into related technologies.

SUMMARY

An optical signal detection scheme is provided in the embodiments of the disclosure to at least address the problem of how to effectively detect the misconnection of optical fibers after coherent reception technologies, including flexible grid, inverse multiplexing and optical devices, are introduced into related technologies.

In accordance with an embodiment of the disclosure, a method for detecting optical signal is provided which includes that: an optical signal receiving node receives, from an optical signal sending node, an optical channel signal and in-band overhead information of the optical channel signal; the optical signal receiving node carries out a misconnection detection on the optical channel signal according to the in-band overhead information and generates corresponding alarm information after determining that there is a misconnection, wherein an Optical Channel Trail Trace Identifier (OCh TTI) and Optical channel signal normal central frequency are carried in the in-band overhead information.

In an embodiment of the disclosure, the process that the optical signal receiving node carries out a misconnection detection on the optical channel signal according to the in-band overhead information and generates corresponding alarm information after determining that there is a misconnection includes that: the optical signal receiving node judges whether the OCh TTI in the received in-band overhead information is equal to an expected OCh TTI reception value and, if the OCh TTI in the received in-band overhead information is not equal to the reception value of the expected OCh TTI, determines that there is a misconnection in the optical channel signal and generates optical channel trace identifier mismatch defect of the optical channel signal.

In an embodiment of the disclosure, the reception value of the expected OCh TTI is configured to the optical signal receiving node by a management plane or a control plane.

In an embodiment of the disclosure, after the optical signal receiving node judges whether the OCh TTI in the received in-band overhead information is equal to an expected OCh TTI reception value, the method further includes: if the OCh TTI in the received in-band overhead information by the optical signal receiving node is equal to the reception value of the expected OCh TTI, judging whether the Optical channel signal normal central frequency in the received in-band overhead information by the optical signal receiving node is equal to a reception value of an normal central frequency of the expected optical channel signal, if the Optical channel signal normal central frequency in the received in-band overhead information by the optical signal receiving node is not equal to the reception value of an normal central frequency of the expected optical channel signal, then determining that there is a misconnection in the optical channel signal and generating mismatch defect alarm information of the Optical channel signal normal central frequency.

In an embodiment of the disclosure, before the optical signal receiving node carries out a misconnection detection on the optical channel signal according to the in-band overhead information, the method further includes that: the management or control plane configures an expected optical channel trail trace identifier and the expected optical channel signal normal central frequency for the optical signal receiving node and distributes the expected optical channel trail trace identifier and the expected optical channel signal normal central frequency to the optical signal receiving node.

In an embodiment of the disclosure, before the optical signal receiving node receives the optical channel signal and the in-band overhead information from the optical channel signal sending node, the method further includes that: the optical signal sending node sends the in-band overhead information while sending the optical channel signal, wherein the optical channel signal and the in-band overhead information reach the optical signal receiving node at the same time through the same optical fiber and the same optical signal intermediate node.

In an embodiment of the disclosure, before the optical signal receiving node receives the optical channel signal and the in-band overhead information from the optical signal sending node, the method further includes that: the optical signal sending node bears an optical data unit or an optical transfer unit in an optical channel administrative group which includes a plurality of optical, and each of optical channels is born on a segment of continuous frequency slots to be transferred.

In an embodiment of the disclosure, the optical signal sending node bears an optical data unit or an optical transfer unit in a plurality of optical channel administrative groups, the optical channel trail trace identifiers in the in-band overhead information of the optical channels in each of the plurality of optical channel administrative groups are different, the optical channel trail trace identifiers in the in-band overhead information of the optical channels in the same optical channel administrative group are the same, and each optical channel in the same optical channel administrative group is uniquely identified by the Optical channel signal normal central frequency.

In accordance with another embodiment of the disclosure, a device for detecting optical signal is provided which is located at an optical signal receiving node and includes: a receiving component configured to receive, from an optical signal sending node, an optical channel signal and the in-band overhead information of the optical channel signal; a detection component configured to carry out misconnection detection on the optical channel signal according to the in-band overhead information received, wherein an OCh TTI and Optical channel signal normal central frequency are carried in the in-band overhead information; and an alarming component configured to generate corresponding alarm information when the detection component determines that there is a misconnection.

In an embodiment of the disclosure, the detection component is further configured to judge whether the OCh TTI in the received in-band overhead information is equal to an expected OCh TTI reception value, and the alarming component is further configured to generate optical channel trace identifier mismatch defect of the optical channel signal if the detection component determines that the OCh TTI in the received in-band overhead information is not equal to the reception value of the expected OCh TTI.

In an embodiment of the disclosure, the reception value of the expected OCh TTI is configured to the optical signal receiving node by a management plane or a control plane.

In an embodiment of the disclosure, after determining that the OCh TTI in the received in-band overhead information is equal to the reception value of the expected OCh TTI, the detection component further judges whether the Optical channel signal normal central frequency in the received in-band overhead information is equal to a reception value of an normal central frequency of the expected optical channel signal; and after the detection component determines that the Optical channel signal normal central frequency in the received in-band overhead information is not equal to the reception value of an normal central frequency of the expected optical channel signal, the alarming component further generates mismatch defect alarm information of the Optical channel signal normal central frequency.

In an embodiment of the disclosure, the reception value of the expected OCh TTI and the reception value of an normal central frequency of the expected optical channel signal are configured to the optical signal receiving node by a management plane or a control plane.

In accordance with still another embodiment of the disclosure, a system for detecting optical signal is further provided which includes: an optical signal sending node and the foregoing optical signal receiving node, wherein the optical signal sending node includes: a sending component configured to send in-band overhead information while sending an optical channel signal; the receiving component in the optical signal receiving node receives the optical channel signal and the in-band overhead information, wherein the optical channel signal and the in-band overhead information reach the optical signal receiving node at the same time through the same optical fiber and the same optical signal intermediate node.

In an embodiment of the disclosure, the optical signal sending node further includes: a preprocessing transfer component configured to bear an optical data unit or an optical transfer unit in a plurality of optical channel administrative groups, wherein each optical channel administrative group includes a plurality of optical, and each of optical channels is born on a segment of continuous frequency slots to be transferred, the OCh TTIs in in-band overhead information of the optical channels in each of the plurality of optical channel administrative groups are different, the OCh TTIs in in-band overhead information of the optical channels in the same optical channel administrative group are the same, and each optical channel in the same optical channel administrative group is uniquely identified by the Optical channel signal normal central frequency.

In the embodiments of the disclosure, an optical signal receiving node receives an optical channel signal and the in-band overhead information of the optical channel signal from an optical signal sending node, carries out a misconnection detection on the optical channel signal according to the OCh TTI and the Optical channel signal normal central frequency carried in the in-band overhead information and generates corresponding alarm information after determining that there is a misconnection, the method, device and system provided herein address the problem of how to effectively detect the misconnection of optical fibers after coherent reception technologies, including flexible grid, inverse multiplexing and optical devices, are introduced into related technologies, improve the optical signal reception accuracy and the error detection and correction capability of a system.

BRIEF DESCRIPTION OF THE DRAWINGS

The accompanying drawings described here are provided for a better understanding of the embodiments of the disclosure and constitute one part of the embodiments of the disclosure, and the exemplary embodiments of the disclosure and description thereof are illustrative of the embodiments of the disclosure but are not to be construed as limiting the embodiments of the disclosure. In the accompanying drawings.

DETAILED DESCRIPTION OF THE EMBODIMENTS

The embodiments of the disclosure are described below in detail with reference to accompanying drawings when read in conjunction with embodiments. It should be noted that embodiments of the disclosure and the features thereof can be combined with each other if no conflict is caused.

Figure 1:
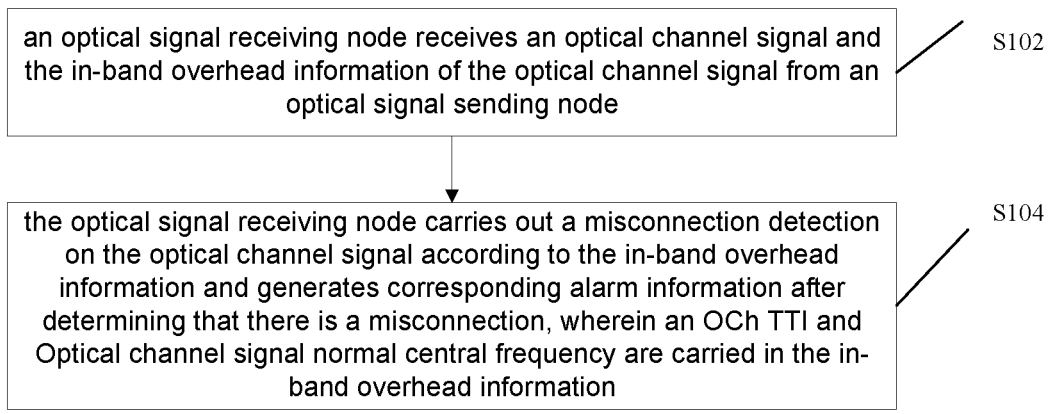
FIG. 1 is a flowchart illustrating a method for detecting optical signal according to an embodiment of the disclosure.

A method for detecting optical signal is provided in an embodiment of the disclosure, FIG. 1 is a flowchart illustrating a method for detecting optical signal according to an embodiment of the disclosure, and as shown in FIG. 1, the method includes the following steps:

Step S102: an optical signal receiving node receives an optical channel signal and the in-band overhead information of the optical channel signal from an optical signal sending node;

Step S104: the optical signal receiving node carries out a misconnection detection on the optical channel signal according to the in-band overhead information and generates corresponding alarm information after determining that there is a misconnection, wherein an OCh TTI and Optical channel signal normal central frequency are carried in the in-band overhead information.

In the steps above, as an optical signal receiving node receives an optical channel signal and the in-band overhead information of the optical channel signal from an optical signal sending node, carries out a misconnection detection on the optical channel signal according to the OCh TTI and the Optical channel signal normal central frequency carried in the in-band overhead information and generates corresponding alarm information after determining that there is a misconnection, the problem is addressed regarding how to effectively detect the misconnection of optical fibers after coherent reception technologies, including flexible grid, inverse multiplexing and optical devices, are introduced into related technologies, and the optical signal reception accuracy and the error detection and correction capability of a system are improved.

For example, in Step S104, the optical signal receiving node judges whether the OCh TTI in the received in-band overhead information is equal to an expected OCh TTI reception value and, if the OCh TTI in the received in-band overhead information is not equal to the reception value of the expected OCh TTI, determines that there is a misconnection in the optical channel signal and generates optical channel trace identifier mismatch defect of the optical channel signal. In an embodiment of the disclosure, the reception value of the expected OCh TTI is configured to the optical signal receiving node by a management plane or a control plane. This method enables an optical signal receiving terminal to timely know an error reception and find the misconnected link according to the alarm information.

In an embodiment of the disclosure, after the optical signal receiving node judges whether the OCh TTI in the received in-band overhead information is equal to an expected OCh TTI reception value, if the OCh TTI in the received in-band overhead information is equal to the expected OCh TTI, then it can be further judged whether the Optical channel signal normal central frequency in the received in-band overhead information by the optical signal receiving node is equal to a reception value of an normal central frequency of the expected optical channel signal, if the Optical channel signal normal central frequency in the received in-band overhead information by the optical signal receiving node is not equal to the reception value of an normal central frequency of the expected optical channel signal, then it can be determined that there is a misconnection in the optical channel signal, and mismatch defect alarm information of the Optical channel signal normal central frequency is generated. This method is simple to implement and highly operable.

In an embodiment of the disclosure, before Step S104 is executed, the management or control plane configures an expected OCh TTI and the expected optical channel signal normal central frequency for the optical signal receiving node and distributes the expected OCh TTI and the expected optical channel signal normal central frequency to the optical signal receiving node.

In an embodiment of the disclosure, before Step S102 is executed, the optical signal sending node sends the in-band overhead information while sending the optical channel signal, wherein the optical channel signal and the in-band overhead information reach the optical signal receiving node at the same time through the same optical fiber and the same optical signal intermediate node. In this way, the accuracy of the in-band overhead information is further guaranteed and the error detection capability of a receiving terminal is improved.

In an embodiment of the disclosure, before Step S102 is executed, the optical signal sending node bears an optical data unit or an optical transfer unit in an optical channel administrative group which includes a plurality of optical, and each of optical channels is born on a segment of continuous frequency slots to be transferred.

In the implementation process, the optical signal sending node may bear an optical data unit or an optical transfer unit in a plurality of optical channel administrative groups, the OCh TTIs in in-band overhead information of the optical channels in each of the plurality of optical channel administrative groups are different, the OCh TTIs in in-band overhead information of the optical channels in the same optical channel administrative group are the same, and each optical channel in the same optical channel administrative group is uniquely identified by the Optical channel signal normal central frequency (e.g. optical channel signal normal central frequencies in different groups may be different, that is, an optical channel may be uniquely identified by an OCh TTI element and an element of the Optical channel signal normal central frequency).

Figure 2:
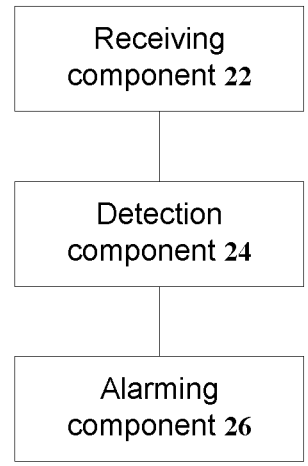
FIG. 2 is a block diagram illustrating the structure of a device for detecting optical signal according to an embodiment of the disclosure.

Corresponding to the foregoing embodiment, a device for detecting optical signal is further provided in an embodiment of the disclosure. FIG. 2 is a block diagram illustrating the structure of a device for detecting optical signal according to an embodiment of the disclosure, and as shown in FIG. 2, the device located at an optical signal receiving node 20 includes: a receiving component 22 configured to receive, from an optical signal sending node, an optical channel signal and the in-band overhead information of the optical channel signal; a detection component 24 coupled with the receiving component 22 and configured to carry out misconnection detection on the optical channel signal according to the in-band overhead information received, wherein an OCh TTI and Optical channel signal normal central frequency are carried in the in-band overhead information; and an alarming component 26 coupled with the detection component 24 and configured to generate corresponding alarm information when the detection component 24 determines that there is a misconnection.

As the receiving component 22 receives the optical channel signal and the in-band overhead information of the optical channel signal from the optical signal sending node, the detection component 24 carries out a misconnection detection on the optical channel signal according to the OCh TTI and the Optical channel signal normal central frequency carried in the in-band overhead information, and the alarming component 26 generates corresponding alarm information after a misconnection is determined, the foregoing device addresses the problem of how to effectively detect the misconnection of optical fibers after coherent reception technologies, including flexible grid, inverse multiplexing and optical devices, are introduced into related technologies and improves the optical signal reception accuracy and the error detection and correction capability of a system.

In an embodiment of the disclosure, the detection component 24 is further configured to judge whether the OCh TTI in the received in-band overhead information is equal to an expected OCh TTI reception value, and the alarming component 26 is further configured to generate optical channel trace identifier mismatch defect of the optical channel signal if the detection component 24 determines that the OCh TTI in the received in-band overhead information is not equal to the reception value of the expected OCh TTI. In the implementation process, the reception value of the expected OCh TTI is configured to the optical signal receiving node by a management plane or a control plane.

In an embodiment of the disclosure, after determining that the OCh TTI in the received in-band overhead information is equal to the reception value of the expected OCh TTI, the detection component 24 further judges whether the Optical channel signal normal central frequency in the received in-band overhead information is equal to a reception value of an normal central frequency of the expected optical channel signal; and after the detection component 24 determines that the Optical channel signal normal central frequency in the received in-band overhead information is not equal to the reception value of an normal central frequency of the expected optical channel signal, the alarming component 26 generates mismatch defect alarm information of the Optical channel signal normal central frequency. In the implementation process, the reception value of the expected OCh TTI and the reception value of an normal central frequency of the expected optical channel signal are configured to the optical signal receiving node by a management plane or a control plane.

Figure 3:
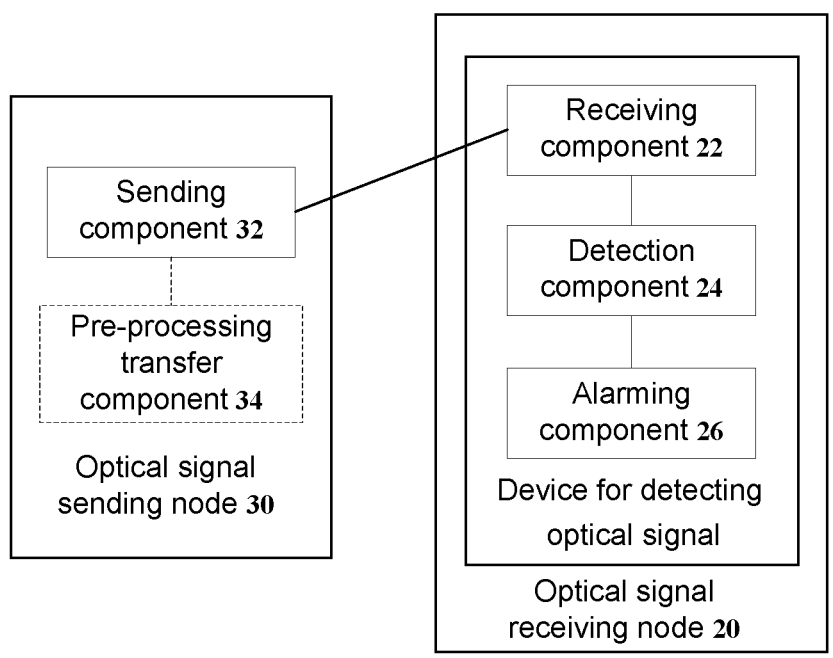
FIG. 3 is a block diagram illustrating the structure of a system for detecting optical signal according to an embodiment of the disclosure.

A system for detecting optical signal is further provided in an embodiment of the disclosure. FIG. 3 is a block diagram illustrating the structure of a system for detecting optical signal according to an embodiment of the disclosure, and as shown in FIG. 3, the system includes: an optical signal sending node 30 and the foregoing optical signal receiving node 20, wherein the optical signal sending node 30 includes: a sending component 32 configured to send in-band overhead information while sending an optical channel signal; the receiving component 22 in the optical signal receiving node 20 receives the optical channel signal and the in-band overhead information, wherein the optical channel signal and the in-band overhead information reach the optical signal receiving node at the same time through the same optical fiber and the same optical signal intermediate node.

In an embodiment of the disclosure, the optical signal sending node 30 further includes: a preprocessing transfer component 34 coupled with the sending component 32 and configured to bear an optical data unit or an optical transfer unit in a plurality of optical channel administrative groups, wherein each optical channel administrative group includes a plurality of optical, and each of optical channels is born on a segment of continuous frequency slots to be transferred, the OCh TTIs in in-band overhead information of the optical channels in each of the plurality of optical channel administrative groups are different, the OCh TTIs in in-band overhead information of the optical channels in the same optical channel administrative group are the same, and each optical channel in the same optical channel administrative group frame is uniquely identified by the Optical channel signal normal central frequency.

The implementation of the foregoing embodiments is described below in detail with reference to preferred embodiments when read in conjunction with accompanying drawings.

Embodiment 1

A misconnection detection method and device or an optical transfer network is provided in the embodiment of the disclosure to at least solve the problem of how to effectively detect the misconnection of optical fibers after coherent reception technologies, including flexible grid, inverse multiplexing and optical devices, are introduced into related technologies.

A beyond-100G technology has become a solution to meet the requirement for higher bandwidth; the Wavelength Division Multiplexing (WDM) of the conventional 50 GHz fixed grid cannot provide a sufficient spectrum width to realize a beyond-100G technology, no matter a 400G technology or a 1T technology. Because of the defects of the fixed grid, a wider flexible grid is needed.

Figure 4:
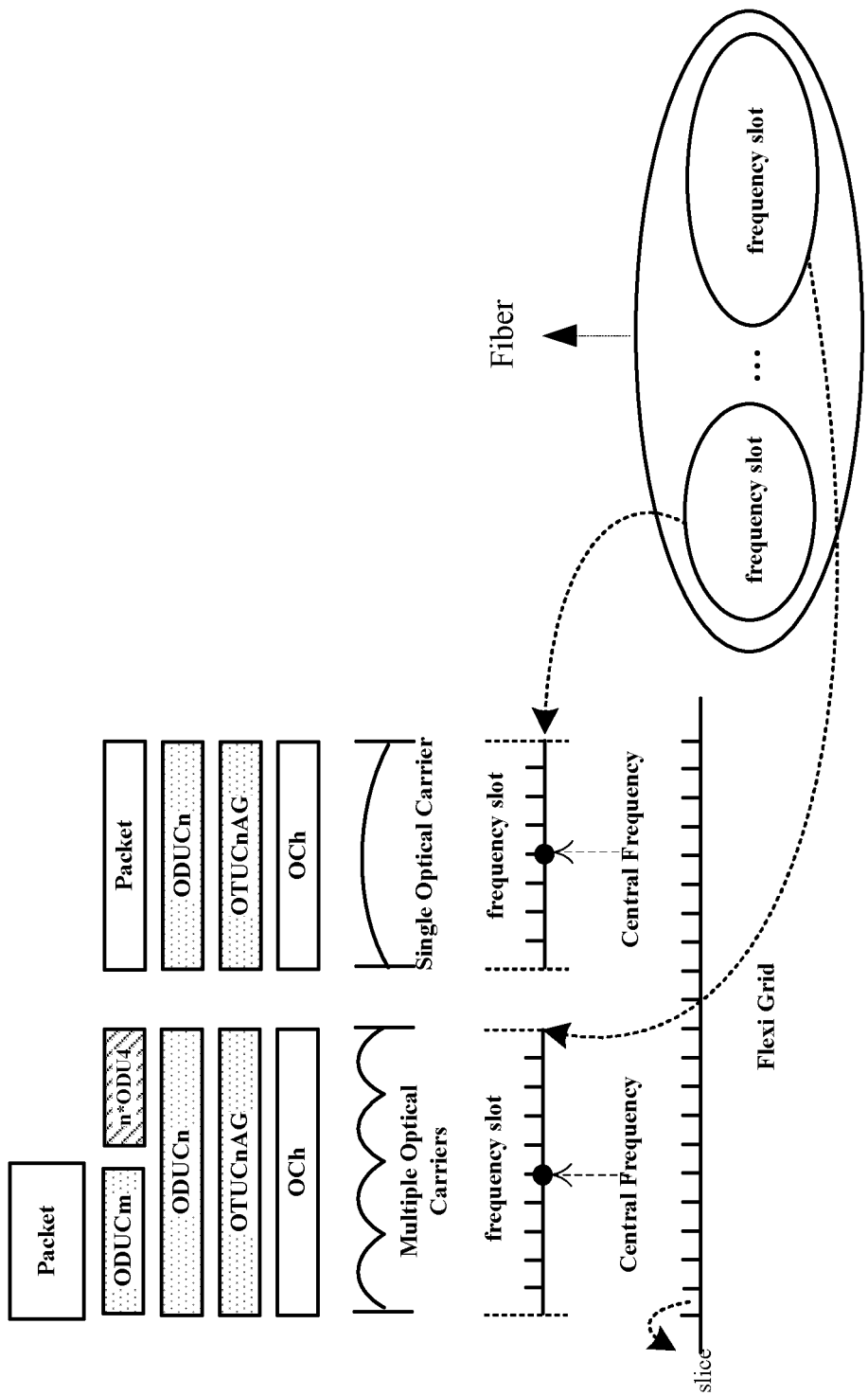
FIG. 4 is a schematic diagram illustrating an ODUCn-OTUCnAG-OCh mapping and multiplexing flow according to embodiment 1 of the disclosure.

FIG. 4 is a schematic diagram illustrating an ODUCn-OTUCnAG-OCh mapping and multiplexing flow according to embodiment 1 of the disclosure. An ODUCn bearing a beyond-100G service is subjected to an ODUCn-OTUCnAG-OCh mapping and multiplexing processing and finally transferred on an optical layer. As shown in FIG. 4, packet service data is mapped to a Super Optical Channel Data Unit (ODUCn, representing a rate higher than ODUk (k=0, 1, 2, 2e, 3, 4)), the ODUCn is mapped to a Super Optical Channel Transport Unit (OTU) High-speed Administrative Group (OTUCnAG), and the OTUCnAG is mapped to a Super Optical Channel (OCh), wherein rates of the ODUCn, the OTUCnAG and the OCh are all N times of 100 Gb/s, and the tributary slot size of the ODUCn is 100 Gb/s, wherein N is a positive integer, which is equal to or greater than 2.

It should be noted that the OTUCnAG is an OTU high-speed administrative group which is a N*100 Gb/s composite signal consisting of N 100G OTU frames, for example, an OTUC2AG represents 200 Gb/s and an OTUC4AG represents 400 Gb/s; the OChAG represents an optical channel signal set for bearing the OTUCnAG, if optical signals pass the same route, then the OChAG provides individual entities to manage the signals; if the signals pass different routes, then a plurality of optical channels OChs are needed, and the signals passing the same route are managed by one optical channel. An ODU 4 bearing a lower-order Optical Channel Data Unit (ODUk) or packet service data and a lower-order ODUCm (m<n) bearing packet service data are jointly multiplexed into a high-order ODUCn, wherein the ODUk at least includes one of: ODU0, ODU1, ODU2, ODU2e, ODU3 and ODUflex; and the high-order ODUCn is mapped to the OTUCnAG.

The introduction of the flexible grid technology creates spectrum fragmentations. For example, when a 1T Ethernet service is transmitted on an optical layer, it may occur that no continuous sufficiently wide spectrum may be provided to transmit a beyond-100G service, thus it is needed to inversely multiplex a 1T electrical layer container (i.e., Optical Channel Transport Unit, OTUCn, Cn is a natural number) to a plurality of discontinuous spectrums for transmission, thereby improving spectrum efficiency and making the best use of fragmentations of spectrum.

Figure 5:
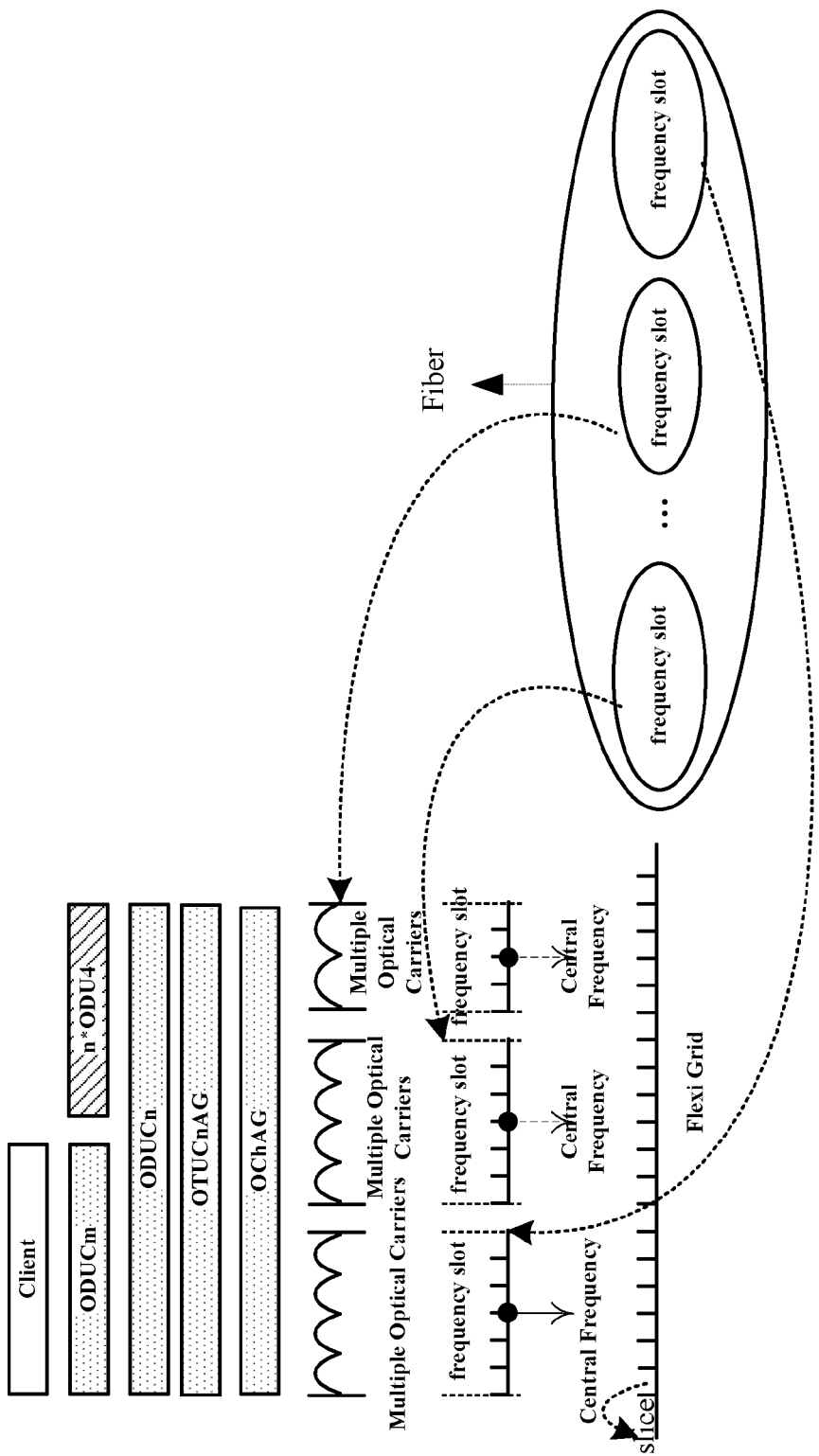
FIG. 5 is a schematic diagram illustrating another ODUCn-OTUCnAG-OCh mapping and multiplexing flow according to embodiment 1 of the disclosure.

FIG. 5 is a schematic diagram illustrating another ODUCn-OTUCnAG-OCh mapping and multiplexing flow according to embodiment 1 of the disclosure, wherein the plurality of optical signals contained in an OChAG are born by discrete spectrums and pass the same route, and as shown in FIG. 5, an ODUCn is mapped to an OTUCnAG passing a single OChAG, the optical signals in the OChAG pass the same route and occupy discrete spectrums. The signals are managed via a single OChAG entity.

Figure 6:
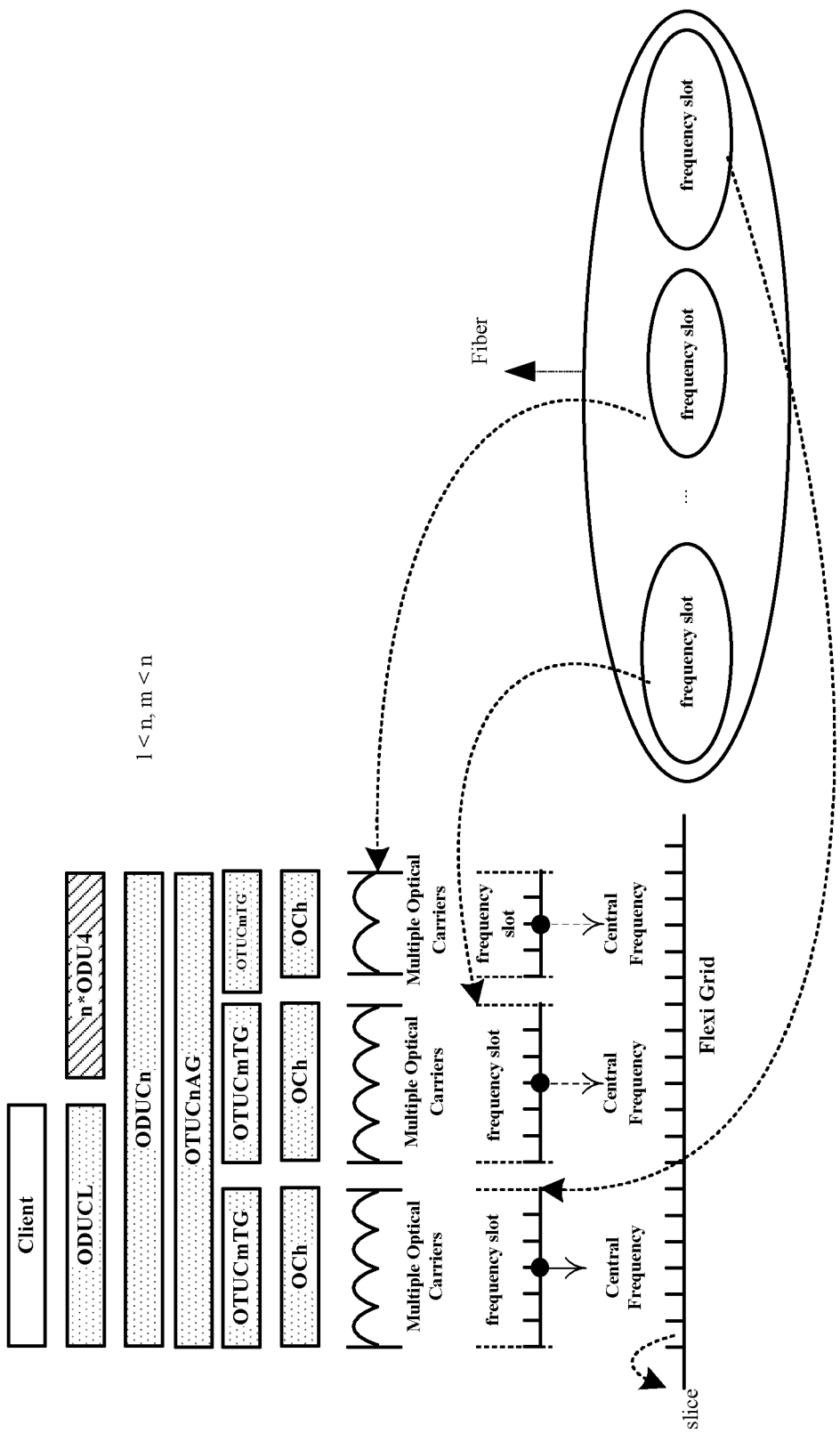
FIG. 6 is a schematic diagram illustrating an ODUCn-OTUCnAG-z*OTUCmTG-OChAG mapping and multiplexing flow according to embodiment 1 of the disclosure.

FIG. 6 is a schematic diagram illustrating an ODUCn-OTUCnAG-z*OTUCmTG-OChAG according to embodiment 1 of the disclosure, in which the plurality of optical signals contained in an OChAG are born by discrete spectrums and pass different routes. As shown in FIG. 6, the process of mapping an ODUCn to an OTUCnAG and then the OTUCnAG to an OChAG includes: inversely multiplexing the OTUCnAG into a plurality of Optical Channel Transport Units (OTUCmTGs) and then mapping the OTUCmTGs into a corresponding OCh, wherein all the rates of the OTUCmTGs are M times of 100 Gb/s, M is equal to or greater than 1 but smaller than N. The OTUCmTG (Transport Group, m<n) is a composite signal the rate of which is m*100 Gb/s. Each OTUCmTG has the same rate level, or all OTUCmTGs have different rate levels.

Figure 7:
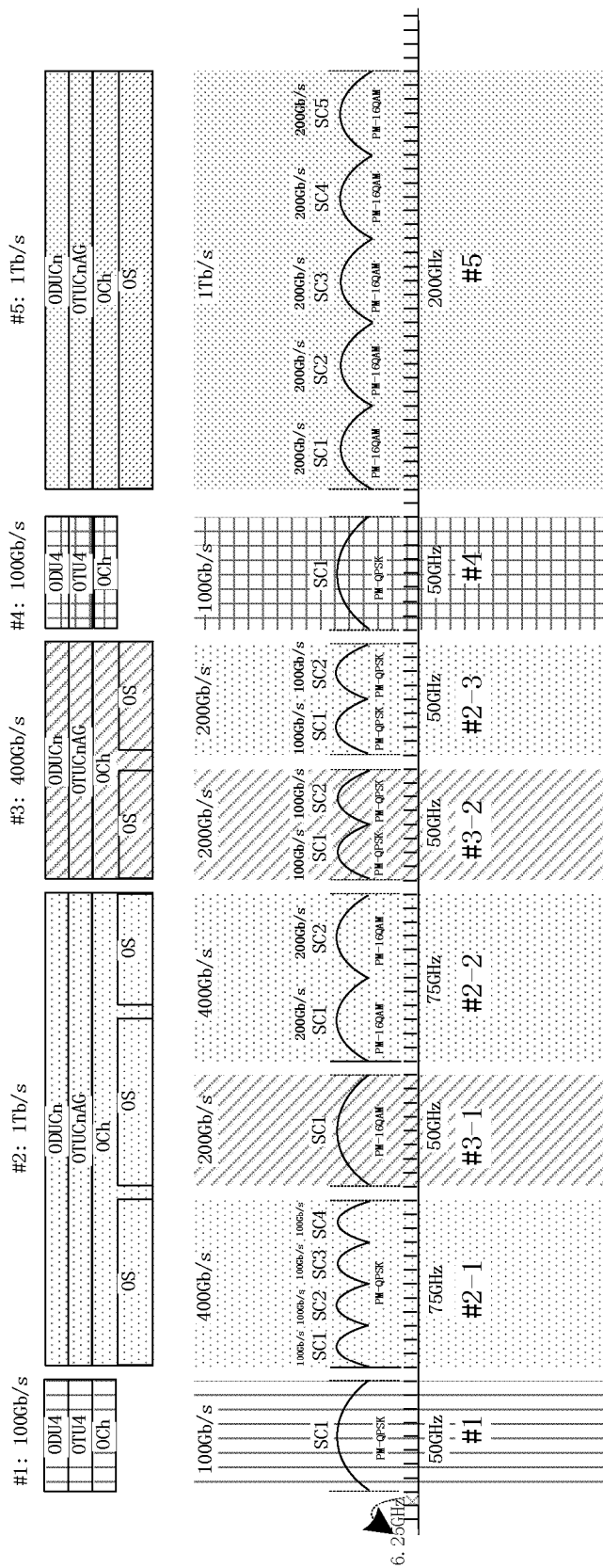
FIG. 7 is a schematic diagram illustrating the mapping, multiplexing and optical signal transfer flow of five signals on the same optical fiber according to embodiment 1 of the disclosure.

FIG. 7 shows an example of an inverse multiplexing technology for the inverse multiplexing process illustrated in FIG. 5, and as shown in FIG. 7 which is a schematic diagram illustrating the mapping, multiplexing and optical signal transmission flow of five signals on the same optical fiber, five services are transmitted on an optical fiber, #1 and #4 are 100 Gb/s signals which both occupy a 50 GHz spectrum resource and which are both transmitted by a single-carrier using a Polarization-multiplexed Quadrature Phase Shift Keying (PM-QPSK) modulation scheme.

2 is a 1 Tbit/s (1 Tb/s) signal, and the payload of the OCh signal is supported by three optical signals (OSs), and the three OSs correspond to three media channels, including two media channels #2-1 and #2-2 the bit rate of which are both 400 Gb/s and a media channel #2-3 the bit rate of which is 200 Gb/s. The media channel #2-1 is transmitted by four sub-carriers (SC) SC1, SC2, SC3 and SC4 using a PM-QPSK modulation scheme, and the four sub-carriers, the bit rates of which are all 100 Gb/s, totally occupy a 75 GHz spectrum resource. The media channel #2-2 is transmitted by two sub-carriers SC1 and SC2 using a PM-16QAM modulation scheme, and the two sub-carriers, the bit rates of which are both 200 Gb/s, totally occupy a 75 GHz spectrum resource. The media channel #2-3 is transmitted by two sub-carriers SC1 and SC2 using a PM-QPSK modulation scheme, and the two sub-carriers, the bit rates of which are both 100 Gb/s, totally occupy a 50 GHz spectrum resource.

3 is a 400 Gbit/s (400 Gb/s) signal, and the payload of the OCh signal is supported by two optical signals which correspond to two media channels #3-1 and #3-2 the bit rates of which are both 200 Gb/s. The media channel #3-1 is transmitted by a single sub-carrier SC1 using a PM-16QAM modulation scheme and occupying a 50 GHz spectrum resource. The media channel #3-2 is transmitted by two sub-carriers SC1 and SC2 using a PM-QPSK modulation scheme, and the two sub-carries, the bit rates of which are both 100 Gb/s, totally occupy a 50 GHz spectrum resource.

5 is a 1 Tbit/s (1 Tb/s) signal, and the payload of the OCh signal is supported by an optical signal (OS) which corresponds to a media channel transmitted by five sub-carriers SC1, SC2, SC3, SC4 and SC5 using a PM-16QAM modulation scheme, and the five sub-carriers, the bit rates of the which are all 200 Gb/s, totally occupy a 200 GHz spectrum resource.

Figure 8:
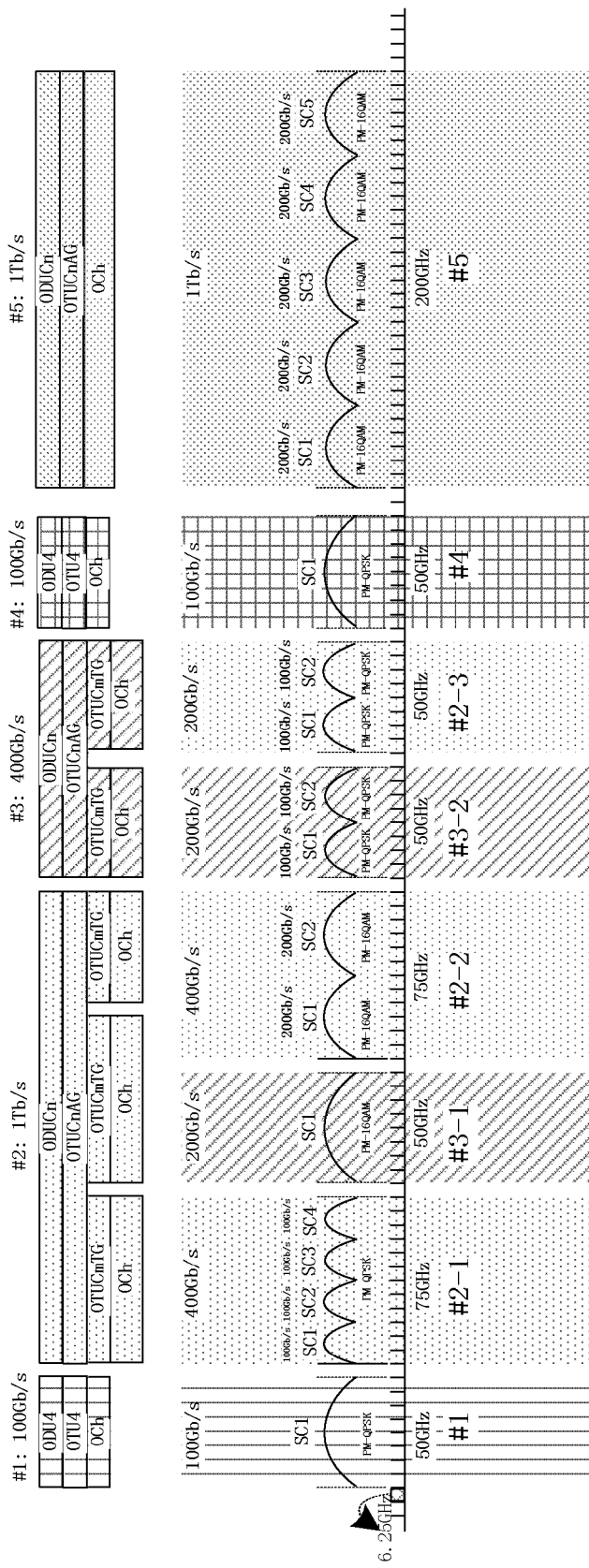
FIG. 8 is a schematic diagram illustrating another mapping, multiplexing and optical signal transfer flow of five signals on the same optical fiber according to embodiment 1 of the disclosure.

FIG. 8 shows an example of an inverse multiplexing technology for the inverse multiplexing process illustrated in FIG. 6, as shown in FIG. 8 which is a schematic diagram illustrating the mapping, multiplexing and optical signal transmission flow of five signals on the same optical fiber, five services are transmitted on an optical fiber, #1 and #4 are 100 Gb/s signals which both occupy a 50 GHz spectrum resource and which are both transmitted by a single carrier using a PM-QPSK modulation scheme.

2 is a 1 Tbit/s (1 Tb/s) signal, the payload of the OTUCnAG signal is supported by three OChs which correspond to three media channels, including two media channels #2-1 and #2-2 the bit rates of which are 400 Gb/s and a media channel #2-3 the bit rate of which is 200 Gb/s. The media channel #2-1 is transmitted by four sub-carriers SC1, SC2, SC3 and SC4 using a PM-QPSK modulation scheme, and the four sub-carriers, the bit rates of which are all 100 Gb/s, totally occupy a 75 GHz spectrum resource. The media channel #2-2 is transmitted by two sub-carriers SC1 and SC2 using a PM-16QAM modulation scheme, and the two sub-carriers, the bit rates of which are both 200 Gb/s, totally occupy a 75 GHz spectrum resource. The media channel #2-3 is transmitted by two sub-carriers SC1 and SC2 using a PM-QPSK modulation scheme, and the two sub-carriers, the bit rates of which are both 100 Gb/s, totally occupy a 50 GHz spectrum resource.

3 is a 400 Gbit/s (400 Gb/s) signal, the payload of the OTUCnAG signal is supported by two OChs which correspond to two media channels #3-1 and #3-2 the bit rates of which are both 200 Gb/s. The media channel #3-1 is transmitted by a single carrier SC1 using a PM-16QAM modulation scheme and occupies a 50 GHz spectrum resource. The media channel #3-2 is transmitted by two sub-carriers SC1 and SC2 using a PM-QPSK modulation scheme, and the two sub-carriers, the bit rates of which are both 100 Gb/s, totally occupy a 50 GHz spectrum resource.

5 is a 1 Tbit/s (1 Tb/s) signal, the payload of the OTUCnAG signal is supported by an OCh which corresponds to a media channel transmitted by five sub-carriers SC1, SC2, SC3, SC4 and SC5 using a PM-16QAM modulation scheme, and the five sub-carriers, the bit rates of which are all 200 Gb/s, totally occupy a 200 GHz spectrum resource.

Embodiment 2

Figure 9:
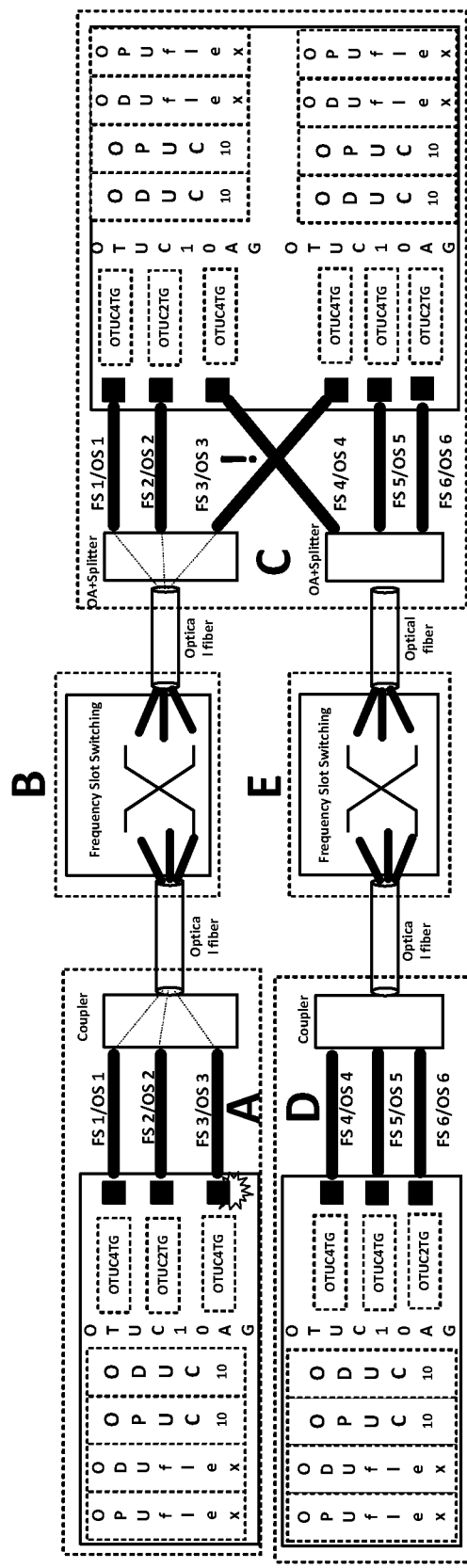
FIG. 9 is a schematic diagram illustrating a misconnection scenario according to embodiment 2 of the disclosure.

FIG. 9 is a schematic diagram illustrating a misconnection scenario according to embodiment 2 of the disclosure, and as shown in FIG. 9, an ODUflex container loading a 1T Ethernet service is respectively mapped to an OPUC10/ODUC10 at nodes A and D.

At the node A, the ODUC10 container is inversely multiplexed to three ODUCmTGs, that is, two ODUC4TGs (400 Gb/s) and an ODUC2TG (200 Gb/s), which are switched onto a line card after passing a cross matrix. The three ODUCmTGs are all independently mapped to OTUCmTGs on the line card in such a manner that the ODUC4TGs are mapped to OTUC4TGs and the ODUC2TG is mapped to an OTUC2TG. After the two OTUC4TGs and the OTUC2TG are converted into optical signals, three frequency slots, that is, a Frequency Slot 1 (FS1, transmission rate: 400 Gb/s), a Frequency Slot 2 (FS2, transmission rate: 200 Gb/s) and a Frequency Slot 3 (FS3, transmission rate: 400 Gb/s), are transmitted from an optical transmitter and coupled to the same optical fiber through a coupler to be transmitted, sequentially, the three frequency slots pass the frequency slot switching matrix of a node B and the optical fibers at nodes B and C and reach the node C; at the node C, the optical signals pass through an Optical Amplifier (OA) and a splitter and are connected to three optical receivers on an OTU line card through three internal optical fibers, the optical receivers scan the optical signals according to a configured central frequency, receive a specific frequency slot and convert the specific frequency slot into an electric signal.

At the node D, the ODUC10 container is also inversely multiplexed to three ODUCmTGs, including two ODUC4TGs (400 Gb/s) and an ODUC2TG (200 Gb/s), which are switched onto a line card after passing a cross matrix. The three ODUCmTGs are all independently mapped to OTUCmTGs on the line card in such a manner that the ODUC4TGs are mapped to OTUC4TGs and the ODUC2TG is mapped to an OTUC2TG. After the two OTUC4TGs and the OTUC2TG are converted into optical signals, three frequency slots, that is, a Frequency Slot 4 (FS4, transmission rate: 400 Gb/s), a Frequency Slot 5 (FS5, transmission rate: 200 Gb/s) and a Frequency Slot 6 (FS6, transmission rate: 400 Gb/s), are transmitted from an optical transmitter and coupled to the same optical fiber through a coupler to be transmitted, sequentially, the three frequency slots pass the frequency slot switching matrix of the node D and the optical fibers at nodes D and C and reach the node C; at the node C, the optical signals pass through an OA and a splitter and are connected to three optical receivers on an OTU line card through three internal optical fibers, the optical receivers scan the optical signals according to a configured central frequency, receive a specific frequency slot and convert the specific frequency slot into an electric signal.

When there is a misconnection between a splitter and the internal optical fiber in am OTU line card inside a device at the node C, for example, there is a misconnection between the FS3 and the FS4 in the node C, as the optical receiver expecting to receive the FS3 configures the central frequency of the FS3 but receives the optical signal FS4, and similarly, the optical receiver expecting to receive the FS4 configures the central frequency of the FS4 but receives the optical signal FS3, as no corresponding frequency slots can be scanned by two optical receivers, no optical signals can be received by the two optical receivers. In the absence of a misconnection detection mechanism, a fault in a network will cause a severe problem. For example, when the optical transmitter for transmitting the FS3 is faulted d at the node A, the optical signal of the FS3 cannot be scanned by the node B, then the node B notifies the node C of an OCh-P Forward Defect Indication (OCh-P FDI), and the node C associates the OCh-P FDI with the FS3 and considers the FS3 invalid. As there is a misconnection between the FS3 and the FS4, the optical receiver expecting to receive the FS4 receives the FS3, and as no optical signals can be sent by an optical transmitter at the node A, the optical receiver expecting to receive the FS4 cannot receive an optical signal, the node C generates an FS4 LOS alarm, as a result, the node C considers that the spectrums related to two ODUC10 are both invalid and determines that the service is invalid. But in fact, there is only one ODUC10 invalid.

Figure 10:
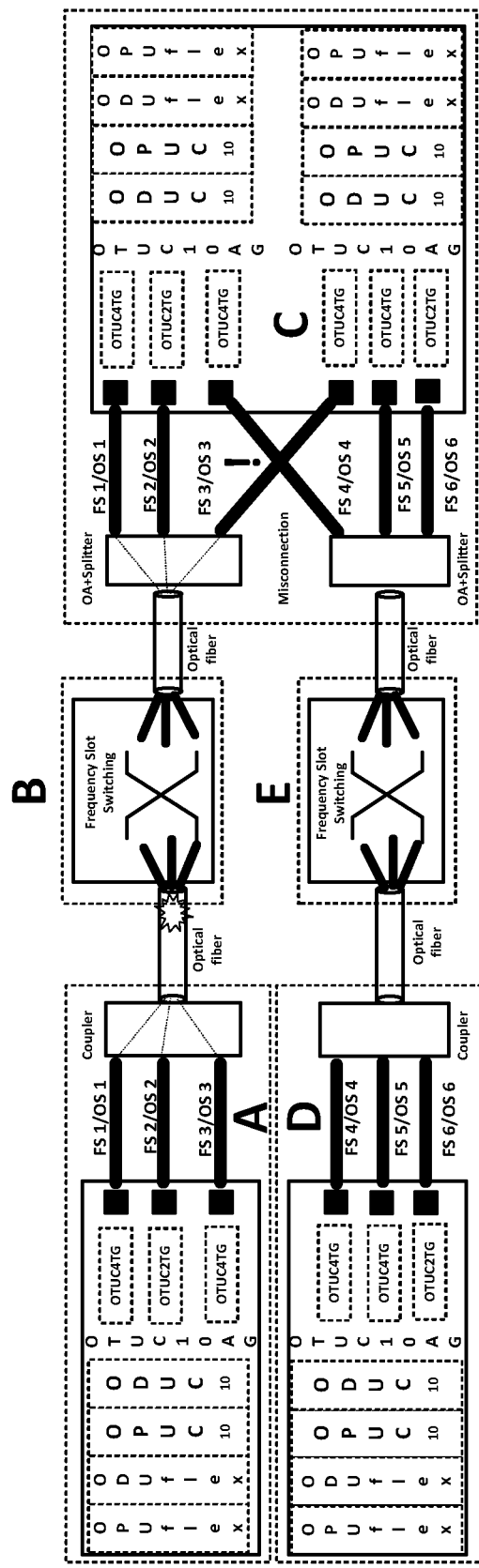
FIG. 10 is a schematic diagram illustrating another misconnection scenario according to embodiment 2 of the disclosure.

FIG. 10 is a schematic diagram illustrating another misconnection scenario according to embodiment 2 of the disclosure, and as shown in FIG. 10, if the optical fiber between the nodes A and B is faulted, for example, cut off, then the FS1, the FS2 and the FS3 cannot be scanned by the node B, the node B notifies the node C of three OCh-P FDI alarms, and after receiving the three alarms, the node C considers the FS1, the FS2 and the FS3 invalid. Similarly, a severe problem appears when a fault occurs in a network using no misconnection detection mechanism. As there is a misconnection between the FS3 and the FS4, the optical receiver expecting to receive the FS4 receives the FS3, and as an optical signal is sent by an optical transmitter at the node A but the optical fiber between the nodes A and B is cut off, the optical signal of the FS3 cannot be transmitted to the node C, the optical receiver expecting to receive the FS4 cannot receive an optical signal, the node C generates an FS4 LOS alarm, as a result, the node C considers that the spectrums related to two ODUC10 are both invalid and determines that two services are invalid. But in fact, only one ODUC10 is invalid.

In the implementation process of the embodiment, the sending node sends in-band overhead information while sending an optical channel signal (OCh-P), wherein the optical channel signal and the in-band overhead information reach the optical signal receiving node at the same time through the same optical fiber and the same node. An OCh Trail Trace Identifier (OCh TTI) and Optical channel signal normal central frequency are carried in the in-band overhead information. The optical signal receiving node receives the in-band overhead information and carries out a misconnection detection according to the OCH TTI and the normal central frequency of the optical signal. If the OCh TTI in the in-band overhead information is not equal to an expected OCh TTI reception value configured to the optical signal receiving node, then an Optical Channel Trace Identifier Mismatch defect alarm is generated to indicate a misconnection inside the network.

Figure 11:
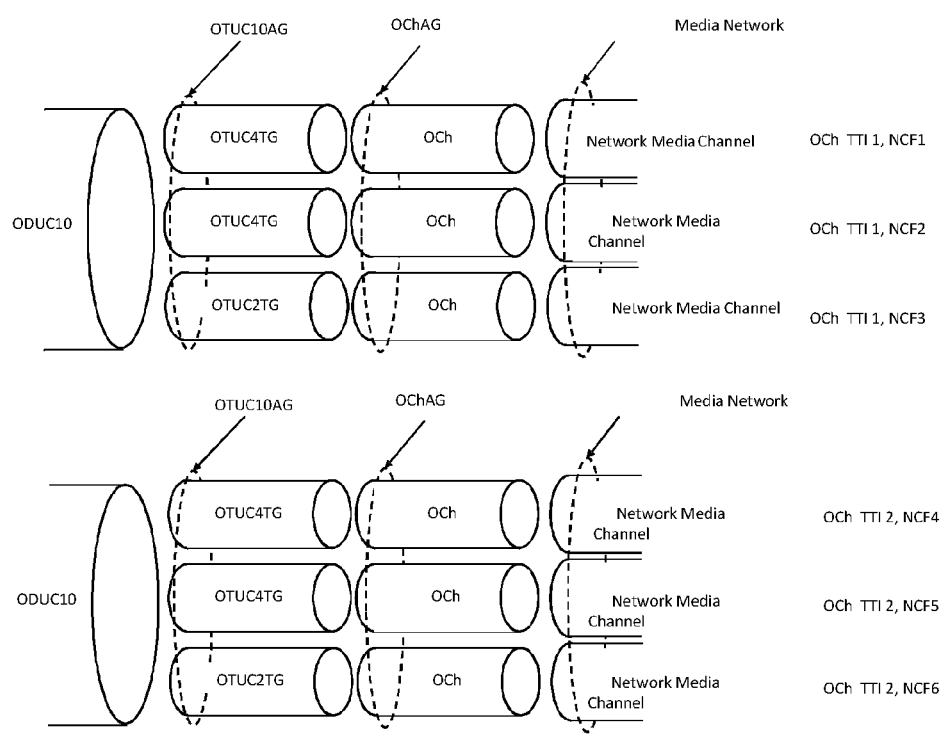
FIG. 11 is a schematic diagram illustrating the assignment of a value to the TTI and the NCF in an OCh according to embodiment 2 of the disclosure.

FIG. 11 is a schematic diagram illustrating the assignment of values for a TTI and a NCF in an OCh according to embodiment 2 of the disclosure, as shown in FIG. 11, aiming at the example shown in FIG. 9 or FIG. 10, two ODUCns are both inversely multiplexed to three optical channel signals (OCh-P), the OCh TTIs in the in-band overhead information of each OCh in a first OChAG must be equal, for example, the OCh TTIs in the in-band overhead information of all the OChS in the first OChAG are all OCh TTI 1, and each OCh is uniquely identified by a Normal Central Frequency (NCF), for example, the FS1, the FS2 and the FS3 in FIG. 9 or FIG. 10 are represented by NCF1, NCF2 and NCF3, respectively. For another OChAG, the OCh TTI in the in-band overhead information of each OCh in the OChAG must be different from the OCh TTIs in the first group, for example, the OCh TTIs in the in-band overhead information of all the OChs in the another OChAG are all OCh TTI 2, and each OCh is uniquely identified using a NCF, for example, the FS4, the FS5 and the FS6 shown in FIG. 9 or FIG. 10 are represented by NCF 4, NCF5 and NCF6, respectively.

when the OCh TTI in the in-band overhead information is equal to the reception value of the expected OCh TTI configured to the optical signal receiving node, then whether the OCh NCF in the in-band overhead information is equal to an expected OCh NCF configured to the optical receiving node is determined, and when the OCh NCF in the in-band overhead information is not equal to the expected OCh NCF, then an Optical Channel Trace Identifier Mismatch defect alarm is generated to indicate a misconnection inside the network.

The foregoing situations are described below in detail. As shown in FIG. 9 and FIG. 10, how to detect a misconnection is described based on an example of the mapping of an ODUflex container loading a 1T Ethernet service to an OPUC10/ODUC10 at nodes A and D.

Step 1: at the node A, the ODUC10 container is inversely multiplexed to three ODUCmTGs, including two ODUC4TGs (400 Gb/s) and an ODUC2TG (200 Gb/s), which are switched onto a line card after passing a cross matrix. The three ODUCmTGs are all independently mapped to OTUCmTGs on the line card in such a manner that the ODUC4TGs are mapped to an OTUC4TG and the ODUC2TG is mapped to an OTUC2TG. After the two OTUC4TGs and the OTUC2TG are converted into optical signals, three frequency slots, that is, a Frequency Slot 1 (FS1, transmission rate: 400 Gb/s), a Frequency Slot 2 (FS2, transmission rate: 200 Gb/s) and a Frequency Slot 3 (FS3, transmission rate: 400 Gb/s), are transmitted from an optical transmitter. The node A sends in-band overhead while sending an optical channel signal (OCh-P), wherein the optical channel signal and the in-band overhead are required to reach the optical signal receiving node at the same time through the same optical fiber and the same node. An OCh TTI and Optical channel signal normal central frequency are carried in the in-band overhead information. As shown in FIG. 11, the OCh TTIs in the in-band overhead information of all the OChs in the OChAG are required to be equal, for example, the OCh TTIs in the in-band overhead information of all the OChs in the OChAG are all OCh TTI 1, and each OCh is uniquely identified using a NCF, for example, the FS1, the FS2 and the FS3 shown in FIG. 9 or FIG. 10 are represented by NCF 1, NCF2 and NCF3, respectively.

The three frequency slots FS1, FS2 and FS3 and spectrums for transmitting their in-band overhead information are coupled to the same one optical fiber through a coupler to be transmitted, sequentially pass the frequency slot switching matrix of a node B and the optical fibers at nodes B and C and reach the node C; at the node C, the optical signals pass through an Optical Amplifier (OA) and a splitter and are connected to three optical receivers on an OTU line card through three internal optical fibers, the optical receivers scan the optical signals according to a configured central frequency, receive a specific frequency slot and convert the specific frequency slot into an electric signal, meanwhile, the node C receives the in-band overhead information associated with the frequency slots FS1, FS2 and FS3.

Step 2: at the node D, the ODUC10 container is also inversely multiplexed to three ODUCmTGs, including two ODUC4TGs (400 Gb/s) and an ODUC2TG (200 Gb/s), which are switched onto a line card after passing a cross matrix. The three ODUCmTGs are all independently mapped to OTUCmTGs on the line card in such a manner that the ODUC4TGs are mapped to an OTUC4TG and the ODUC2TG is mapped to an OTUC2TG. After the two OTUC4TGs and the OTUC2TG are converted into optical signals, three frequency slots, that is, a Frequency Slot 4 (FS4, transmission rate: 400 Gb/s), a Frequency Slot 5 (FS5, transmission rate: 200 Gb/s) and a Frequency Slot 6 (FS6, transmission rate: 400 Gb/s), are transmitted from an optical transmitter.

The node D sends in-band overhead while sending an optical channel signal (OCh-P), wherein the optical channel signal and the in-band overhead information reach the optical signal receiving node at the same time through the same optical fiber and the same node. An OCh TTI and Optical channel signal normal central frequency are carried in the in-band overhead information. As shown in FIG. 11, the OCh Ills in the in-band overhead information of all the OChs in the OChAG are required to be equal, for example, the OCh TTIs in the in-band overhead information of all the OChs in the OChAG are all OCh TTI 2, and each OCh is uniquely identified using a NCF, for example, the FS4, the FS5 and the FS6 shown in FIG. 9 or FIG. 10 are represented by NCF 4, NCF5 and NCF6, respectively.

The three frequency slots FS4, FS5 and FS6 and spectrums for transmitting their in-band overhead information are coupled to the same optical fiber through a coupler to be transmitted, sequentially pass the frequency slot switching matrix of a node E and the optical fibers at nodes E and C and reach the node C; at the node C, the optical signals pass through an Optical Amplifier (OA) and a splitter and are connected to three optical receivers on an OTU line card through three internal optical fibers, the optical receivers scan the optical signals according to a configured central frequency, receive a specific frequency slot and convert the specific frequency slot into an electric signal, meanwhile, the node C receives the in-band overhead information associated with the frequency slots FS4, FS5 and FS6.

Step 3: after receiving the in-band overhead information (OCh-P TTI and NCF) associated with the optical channel signal, the node C carries out a misconnection detection according to the OCH TTI and the NCF of the optical signal. when the OCh TTI in the in-band overhead information is not equal to the reception value of the expected OCh TTI configured to the optical signal receiving node, then an OCh Trace Identifier Mismatch defect (OCh dTIM) alarm is generated to indicate a misconnection, and an OCh dTIM alarm is generated.

when the OCh TTI in the in-band overhead information is equal to the reception value of the expected OCh TTI configured to the optical signal receiving node, then whether the OCh NCF in the in-band overhead information is equal to the expected OCh NCF configured to the optical receiving node is determined, and when the OCh NCF in the in-band overhead information is not equal to the expected OCh NCF configured to the optical receiving node, then an OCh dTIM alarm is generated to indicate a misconnection inside the network, and an OCh dTIM alarm is generated.

If the OCh TTI and the NCF in the in-band overhead information are equal to the expected OCh TTI and the expected NCF configured to the optical signal receiving node, then there is no misconnection.

For example, as shown in FIG. 9 or FIG. 10, there is a misconnection between a splitter and the internal optical fiber in an OUT line card inside a device at the node C, for example, there is a misconnection between the FS3 and the FS4 in the node C, as the optical receiver expecting to receive the FS3 configures the central frequency of the FS3 but receives the optical signals including the FS4, the FS5 and the FS6, and similarly, the optical receiver expecting to receive the FS4 configures the central frequency of the FS4 but receives the optical signals including the FS1, the FS2 and the FS3. As a consequence, the optical receiver expecting to receive the FS3 actually receives in-band overhead information OCh TTI 2, NCF4, NCF5 and NCF6 while the OCh TTI and the NCF the optical receiver configured at the node C expect to receive are OCh TTI 1 and NCF 3, the node C compares the OCh TTIs and the NCFs and finds that the OCh TTIs and the NCFs are both different and therefore reports an FS3 dTIM alarm. The optical receiver expecting to receive the FS4 actually receives in-band overhead information OCh TTI 1, NCF3, NCF2 and NCF1 while the OCh TTI and the NCF the optical receiver configured at the node C expect to receive are OCh TTI 2 and NCF 4, NCF5 and NCF 6, the node C compares the OCh TTIs and the NCFs and finds that the OCh TTIs and the NCFs are both different and therefore reports an FS4 dTIM alarm.

Embodiment 3

Figure 12:
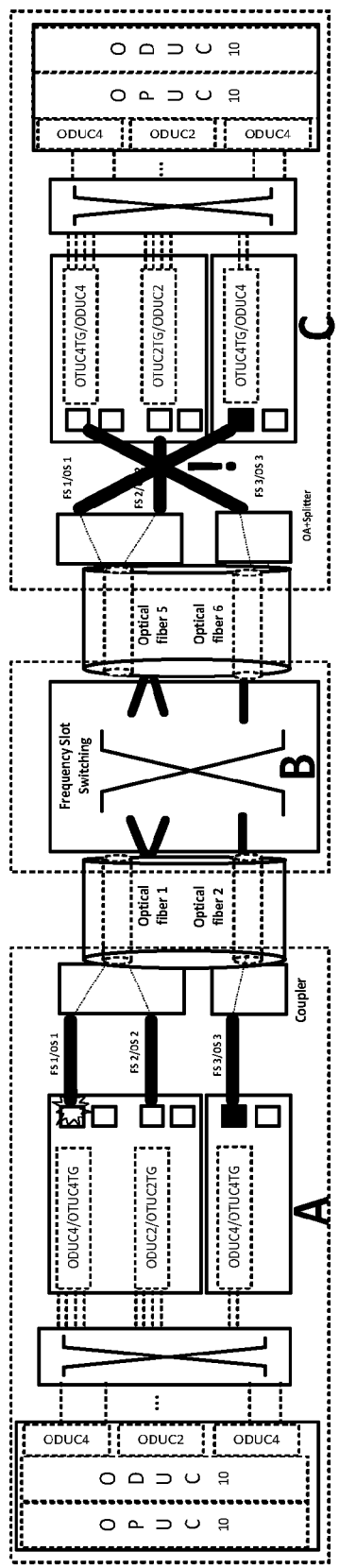
FIG. 12 is a schematic diagram illustrating a misconnection scenario according to embodiment 3 of the disclosure.

FIG. 12 is a schematic diagram illustrating a misconnection scenario according to embodiment 3 of the disclosure, and as shown in FIG. 12, how to detect a misconnection inside the node C at a node A is described below based on an example of an ODUC10 container loading a 1T Ethernet service and passing through the nodes A, B and C.

Step 1: at the node A, the ODUC10 container is inversely multiplexed to three ODUCmTGs, including two ODUC4TGs (400 Gb/s) and an ODUC2TG (200 Gb/s), after the three ODUCmTGs pass a cross matrix, one of the ODUC4TGs and the OTUC2TG are switched onto a line card while the other ODUC4TG is separately switched to another line card. On the two line cards, the three ODUCmTGs are all independently mapped to OTUCmTGs in such a manner that the ODUC4TGs are mapped to OTUC4TGs and the ODUC2TG is mapped to an OTUC2TG. After the two OTUC4TGs and the OTUC2TG are converted into optical signals, three frequency slots, that is, a Frequency Slot 1 (FS4, transmission rate: 400 Gb/s), a Frequency Slot 2 (FS5, transmission rate: 200 Gb/s) and a Frequency Slot 3 (FS6, transmission rate: 400 Gb/s), are transmitted from an optical transmitter.

The node A sends in-band overhead while sending an optical channel signal (OCh-P), wherein the optical channel signal and the in-band overhead reach the optical signal receiving node at the same time through the same optical fiber and the same node. An OCh TTI and Optical channel signal normal central frequency are carried in the in-band overhead information. As shown in FIG. 12, the OCh TTIs in the in-band overhead information of all the OChs in the OChAG must be equal, for example, the OCh TTIs in the in-band overhead information of all the OChs in the OChAG are all OCh TTI 1, and each OCh is uniquely identified using a NCF, for example, the FS1, the FS2 and the FS3 are represented by NCF 1, NCF2 and NCF3, respectively.

The frequency slots FS1 and FS2 and spectrums for transmitting their in-band overhead information are coupled to the same optical fiber through a coupler to be transmitted, sequentially pass the frequency slot switching matrix of the node B and the optical fibers at nodes E and C and reach the node C; at the node C, the frequency slot F3 and the spectrum for transmitting in-band overhead information are coupled to the same optical fiber through a coupler to be transmitted, sequentially pass the frequency slot switching matrix of the node B and the optical fibers at nodes E and C and reach the node C.

At the node C, optical signals pass through an Optical Amplifier (OA) and a splitter and are connected to three optical receivers on an OTU line card through three internal optical fibers, the optical receivers scan the optical signals according to a configured central frequency, receive a specific frequency slot and convert the specific frequency slot into an electric signal, meanwhile, the node C receives the in-band overhead information associated with the frequency slots FS1, FS2 and FS3.

Step 2: after receiving the in-band overhead information (OCh-P TTI and NCF) associated with the optical channel signal, the node C carries out a misconnection detection according to the OCH TTI and the NCF of the optical signal. If the OCh TTI in the in-band overhead information is not equal to the reception value of the expected OCh TTI configured to the optical signal receiving node, then an OCh Trace Identifier Mismatch defect (OCh dTIM) alarm is generated to indicate a misconnection, and an OCh dTIM alarm is generated.

If the OCh TTI in the in-band overhead information is equal to The reception value of the expected OCh TTI configured to the optical signal receiving node, then whether the OCh NCF in the in-band overhead information is equal to the expected OCh NCF configured to the optical receiving node is determined, and if the OCh NCF in the in-band overhead information is not equal to the expected OCh NCF configured to the optical receiving node, then an OCh dTIM defect alarm is generated to indicate a misconnection inside the network, and an OCh dTIM alarm is generated.

If the OCh TTI and the NCF in the in-band overhead information are equal to the expected OCh TTI and the expected NCF configured to the optical signal receiving node, then there is no misconnection.

For example, as shown in FIG. 12, there is a misconnection between a splitter and the internal optical fiber in an OTU line card inside a device at the node C, for example, there is a misconnection between the FS1 and the FS3 in the node C. As the optical receiver expecting to receive the FS1 configures the central frequency of the FS1 but receives an optical signal FS3, and similarly, the optical receiver expecting to receive the FS3 configures the central frequency of the FS3 but receives optical signals FS1 and FS2, the optical receiver expecting to receive the FS3 actually receives in-band overhead information OCh TTI 1, NCF1 and NCF2, however, the OCh TTI and the NCF the optical receiver configured at the node C expect to receive are OCh TTI 1 and NCF 3, the node C compares the OCh TTIs and the NCFs and finds that although the OCh TTIs are equal, the NCFs are different and therefore reports an FS3 dTIM alarm. On the other hand, the optical receiver expecting to receive the FS1 actually receives in-band overhead information OCh TTI 1 and NCF3, however, the OCh TTI and the NCF the optical receiver configured at the node C expect to receive are OCh TTI 1 and NCF 1, the node C compares the OCh TTIs and the NCFs and finds that although the OCh TTIs are equal, the NCFs are different and therefore reports an FS1 dTIM alarm.

To sum up, in the disclosure, an optical signal receiving node receives an optical channel signal and the in-band overhead information of the optical channel signal from an optical signal sending node, carries out a misconnection detection on the optical channel signal according to the optical channel path trace identifier and the Optical channel signal normal central frequency carried in the in-band overhead information and generates corresponding alarm information after determining that there is a misconnection, the method, device and system provided herein address the problem of how to effectively detect the misconnection of optical fibers after coherent reception technologies, including flexible grid, inverse multiplexing and optical devices, are introduced into related technologies and improve the optical signal reception accuracy and the error detection and correction capability of a system.

Apparently, it should be appreciated by those skilled in the art that each component or step described in the disclosure can be realized by a universal computer and that the components or steps may be integrated on a single computer or distributed on a network consisting of a plurality of computers, optionally, the components or steps may be realized by executable program codes so that the components or steps can be stored in a memory to be executed by a computer, or the components or steps are formed into integrated circuit components, or several of the components or steps are formed into integrated circuit components. Therefore, the disclosure is not limited to the combination of specific hardware and software.

The mentioned above is only preferred embodiments of the invention but not limitation to the invention, it should be appreciated that various modification and variations can be devised by those of ordinary skill in the art. Any modification, substitute or improvement devised without departing from the spirit and scope of the disclosure should fall within the protection range of the disclosure.

What is claimed is:

1. A method for detecting optical signal, comprising:
    receiving, by an optical signal receiving node, an optical channel signal and in-band overhead information of the optical channel signal from an optical signal sending node;
    carrying out, by the optical signal receiving node, a misconnection detection, on the optical channel signal according to the in-band overhead information and generating corresponding alarm information after determining that there is a misconnection, wherein an Optical Channel Trail Trace Identifier, OCh TTI, and Optical channel signal normal central frequency are carried in the in-band overhead information, an optical data unit or an optical transfer unit is born in a plurality of optical channel administrative groups, OchAGs, by the optical signal sending node, each OChAG in the plurality of OChAGs comprises a plurality of optical channels, the OCh TTIs in in-band overhead information of the optical channels in each of the plurality of OChAGs are different, the OCh TTIs in in-band overhead information of the optical channels in the same OChAG are the same, and each optical channel in the same OChAG is uniquely identified by the Optical channel signal normal central frequency;
    wherein the step of the optical signal receiving node carries out a misconnection detection on the optical channel signal according to the in-band overhead information and generates corresponding alarm information after determining that there is a misconnection comprises: the optical signal receiving node judges whether the OCh TTI in the received in-band overhead information is equal to an expected OCh TTI reception value, and when the OCh TTI in the received in-band overhead information is not equal to the reception value of the expected OCh TTI, the optical signal receiving node determines that there is a misconnection in the optical channel signal and generates optical channel trace identifier mismatch defect of the optical channel signal.

2. The method according to claim 1, wherein the reception value of the expected OCh TTI is configured to the optical signal receiving node by a management plane or control plane.

3. The method according to claim 1, wherein after the optical signal receiving node judges whether the OCh TTI in the received in-band overhead information is equal to the expected OCh TTI reception value, the method further comprises:
    when the OCh TTI in the received in-band overhead information by the optical signal receiving node is equal to the reception value of the expected OCh TTI, judging whether the Optical channel signal normal central frequency in the received in-band overhead information by the optical signal receiving node is equal to a reception value of an normal central frequency of the expected optical channel signal; and
    when the Optical channel signal normal central frequency in the received in-band overhead information by the optical signal receiving node is not equal to the reception value of an normal central frequency of the expected optical channel signal, determining that there is a misconnection in the optical channel signal and generating the mismatch defect alarm information of the Optical channel signal normal central frequency.

4. The method according to claim 3, wherein before the optical signal receiving node carries out a misconnection detection on the optical channel signal according to the in-band overhead information, the method further comprises:
    configuring, by the management or control plane, the expected OCh TTI and the expected optical channel signal normal central frequency for the optical signal receiving node and distributing the expected OCh TTI and the expected optical channel signal normal central frequency to the optical signal receiving node.

5. The method according to claim 1, wherein before the optical signal receiving node receives the optical channel signal and the in-band overhead information from the optical channel signal sending node, the method further comprises:
    sending, by the optical signal sending node, the in-band overhead information while sending the optical channel signal,
    wherein the optical channel signal and the in-band overhead information reach the optical signal receiving node at the same time through the same optical fiber and the same optical signal intermediate node.

6. The method according to claim 1, wherein before the optical signal receiving node receives the optical channel signal and the in-band overhead information from the optical signal sending node, the method further comprises:

bearing, by the optical signal sending node, the optical data unit or the optical transfer unit in an optical channel management group, wherein each of optical channels is born on a segment of continuous frequency slots to be transferred.

7. The method according to claim 6, wherein the optical signal sending node bears the optical data unit or the optical transfer unit in the plurality of OChAGs.

8. A device for detecting optical signal, which is located at an optical signal receiving node, comprising:

a receiving component configured to receive, from an optical signal sending node, an optical channel signal and the in-band overhead information of the optical channel signal;

a detection component configured to carry out misconnection detection on the optical channel signal according to the in-band overhead information received, wherein an OCh TTI and Optical channel signal normal central frequency are carried in the in-band overhead information, an optical data unit or an optical transfer unit is born in a plurality of optical channel administrative groups, OChAGs, by the optical signal sending node, each OChAG in the plurality of OChAGs comprises a plurality of optical channels, the OCh TTIs in in-band overhead information of the optical channels in each of the plurality of OChAGs are different, the OCh TTIs in in-band overhead information of the optical channels in the same OChAG are the same, and each optical channel in the same OChAG is uniquely identified by the Optical channel signal normal central frequency; and an alarming component configured to generate corresponding alarm information when the detection component determines that there is a misconnection;

wherein the detection component is further configured to judge whether the OCh TTI in the received in-band overhead information is equal to an expected OCh TTI reception value, and the alarming component is further configured to generate optical channel trace identifier mismatch defect of the optical channel signal when the detection component determines that the OCh TTI in the received in-band overhead information is not equal to the reception value of the expected OCh TTI.

9. The device according to claim 8, wherein the reception value of the expected OCh TTI is configured to the optical signal receiving node by a management plane or a control plane.

10. The device according to claim 8, wherein the detection component is further configured to judge whether the Optical channel signal normal central frequency in the received in-band overhead information is equal to a reception value of an normal central frequency of the expected optical channel signal after determining that the OCh TTI in the received in-band overhead information is equal to the reception value of the expected OCh TTI; and after the detection component determines that the Optical channel signal normal central frequency in the received in-band overhead information is not equal to the reception value of an normal central frequency of the expected optical channel signal, the alarming component is further configured to generate mismatch defect alarm information of the Optical channel signal normal central frequency.

11. The device according to claim 10, wherein the reception value of the expected OCh TTI and the reception value of an normal central frequency of the expected optical channel signal are configured to the optical signal receiving node by a management plane or a control plane.

12. A system for detecting optical signal, characterized by comprising an optical signal sending node and the optical signal receiving node of any one of claims 8, 9 to 11, wherein the optical signal sending node comprises: a sending component configured to send in-band overhead information while sending an optical channel signal;

the receiving component in the optical signal receiving node receives the optical channel signal and the in-band overhead information, wherein the optical channel signal and the in-band overhead information reach the optical signal receiving node at the same time through the same optical fiber and the same optical signal intermediate node.

13. The system according to claim 12, wherein the optical signal sending node further comprises:

a preprocessing transfer component configured to bear the optical data unit or the optical transfer unit in the plurality of OChAGs, wherein each of optical channels is born on a segment of continuous frequency slots to be transferred.

* * * * *